(12) United States Patent
Kitamura (10) Patent No.: US 7,832,657 B2
(45) Date of Patent: Nov. 16, 2010

(54) APPARATUS FOR LOWERING WATER TEMPERATURE OF SEA SURFACE

(75) Inventor: Koichi Kitamura, Mie-ken (JP)

(73) Assignee: Kabushiki Kaisha Isekogyo, Kuwana-shi, Mie-ken (JP)

( * ) Notice: Subject to any disclaimer, the term of this patent is extended or adjusted under 35 U.S.C. 154(b) by 609 days.

(21) Appl. No.: 11/355,978

(22) Filed: Feb. 17, 2006

(65) Prior Publication Data

US 2006/0185365 A1 Aug. 24, 2006

(30) Foreign Application Priority Data

Feb. 18, 2005 (JP) ............................. 2005-043198
Jan. 30, 2006 (JP) ............................. 2006-021005

(51) Int. Cl.
| | |
|---|---|
| *A01G 15/00* | (2006.01) |
| *E01H 13/00* | (2006.01) |
| *B63B 35/44* | (2006.01) |
| *C02F 1/00* | (2006.01) |
| *E02B 15/04* | (2006.01) |

(52) U.S. Cl. ...................... 239/14.1; 239/2.1; 114/264; 114/265; 114/266; 210/170.11; 210/242.1

(58) Field of Classification Search .................. 239/2.1, 239/14.1; 114/264, 265, 266; 210/170.11, 210/242.1, 747; 405/223.1, 224

See application file for complete search history.

(56) References Cited

U.S. PATENT DOCUMENTS

| | | | | |
|---|---|---|---|---|
| 4,245,475 A | * | 1/1981 | Girden | ....................... 60/641.7 |
| 4,470,544 A | * | 9/1984 | Bronicki et al. | ............... 239/2.1 |
| 4,603,553 A | * | 8/1986 | Ridgway | .................... 60/641.7 |
| 5,441,200 A | | 8/1995 | Rovella, II | .................... 239/2.1 |
| 6,315,213 B1 | | 11/2001 | Cordani | ...................... 239/2.1 |
| 2002/0008155 A1 | * | 1/2002 | Uram | ........................ 239/14.1 |
| 2005/0133612 A1 | * | 6/2005 | Uram | ......................... 239/2.1 |

FOREIGN PATENT DOCUMENTS

| | | |
|---|---|---|
| JP | 7-99862 | 4/1995 |
| JP | 11-71735 | 3/1999 |
| JP | 2004-49960 | 2/2004 |

* cited by examiner

*Primary Examiner*—Len Tran
*Assistant Examiner*—Ryan Reis
(74) *Attorney, Agent, or Firm*—Jacobson Holman PLLC (57) ABSTRACT

By efficiently lowering a water temperature of a sea surface to thereby suppress an evaporation of a water vapor from the sea surface by lowering the water temperature of the sea surface, a generation of an atmospheric depression is prevented or its strength is weakened. Further, by suppressing a rise of the sea surface temperature, a generation of a red tide or a blue tide is prevented or reduced. As an apparatus for lowering the water temperature of the sea surface, it is constituted such that a pipe for feeding a water is installed in a sea, a suction port of the pipe is disposed in a cold water zone whose temperature is lower than the water temperature of an aim sea surface, an injection port of the pipe is disposed in a required position below the sea surface, and a pump is connected to the pipe in order to suck a cold water from the suction port and inject it from the injection port to thereby supply it below the sea surface in a region of the aim sea surface, thereby mixing it with a warm water of higher temperature.

5 Claims, 7 Drawing Sheets

APPARATUS FOR LOWERING WATER TEMPERATURE OF SEA SURFACE

BACKGROUND OF THE INVENTION

1. Field of the Invention

The present invention relates to an apparatus for lowering a water temperature of a sea surface.

2. Description of the Related Art

The water temperature in a water surface is one of factors exerting an influence on an environment. For example, there is a warm current, which is famous as EL Nino phenomenon, flowing toward the south along a coast of Peru, and there has become clear a correlation that, when the El Nino grows by high temperatures, a frequency in which typhoons generate in the West Pacific Ocean increases as well. Even setting aside the example of a global scale like this, a tendency that, if an evaporation from the seawater surface becomes active by the high temperatures, an atmospheric depression becomes liable to generate is a generally recognized matter. Further, in a case of a closed water surface whose scale is small, a water temperature rise becomes one of causes of a situation in which a blue tide and a red tide are liable to generate, and exerts a large influence on an ecology of marine organism.

JP-A-7-99862 (Japanese Patent No. 3282152) treats a water temperature control system of a marine deep layer water and surface layer water for a marine organism production, and there is constituted such that the cooled surface layer water, which is discharged from a heat exchanger and an evaporator of a heat pump, is used as the marine water for the marine organism production. That is, since the deep layer water having been taken and the surface layer water are fed to the heat exchanger to thereby perform a heat exchange by giving only a heat quantity that the surface layer water has to the deep water layer, it is possible to obtain individually the cooled surface layer water and the heated deep layer water, so that there is brought about an advantage that the surface layer water and the deep layer water, each of which has a set water temperature level, are obtained. However, in the method of this invention, since the heat pump, which possesses the heat exchanger and a condenser, and another equipment are necessary, an objet capable of being applied is limited, so that it is not easy to enlarge more than that.

JP-A-11-71735 relates to a method of preventing a seawater from being warmed, and has a purpose of lowering the temperature of the seawater by causing a low temperature water stagnating in a deep place of the seawater to ascend, thereby exerting a wave motion to a high temperature water in a sea surface side. In a case of this invention, there is adopted a constitution in which the air from a compressed air apparatus is injected upward from a deep place in the sea by using an injection nozzle to thereby push upward the low temperature water stagnating in the sea by a pressure of the air. However, in order to inject air bubbles from the deep place in the sea, there is required a pressure capable of injecting them while overcoming a pressure in that deep sea and, moreover in the deep sea since the bubble is compressed and ought to become small by a high pressure, there is a question as to whether or not it is possible to efficiently push upward the low temperature water.

JP-A-2004-49960 is aimed at removing an eutrophic substance by an aeration from a water bottom, and is common to the above invention in a point that the low temperature water is carried upward by the air bubbles. However, this invention is one generating a gentle induced flow together with an increase in dissolved oxygen concentration and, since it is not one suggesting the fact that the low temperature water is carried to the surface layer by the induced flow following upon the aeration from such a depth as exceeding 100 meters, a very shallow water region is made an object, and a necessary pressure is comparatively low.

Incidentally, U.S. Pat. No. 5,441,200 discloses a method of disintegrating a tropical cyclone which has already generated. In this invention, there is adopted means in which such a chemical that the cyclone causes a self-disintegration action is supplied to an eye of the tropical cyclone. By the fact that a water vapor combines with the chemical to thereby form large molecules and a wall of the eye spins out by a centrifugal force, a diameter of the eye enlarges, a wind velocity decreases, and a storm becomes minimum. Further, U.S. Pat. No. 6,315,213 relates to one which intends, by throwing a crosslinking polymer into a cloud, to cause a rain to be absorbed to the polymer, and one by which, as a result since it solidifies while becoming a gelatin-like substance, a strength weakens, and a rainfall ability of the cloud decreases.

Each of the former three treats a technique for lowering the water temperature of the sea surface and is based on a consideration that, if the evaporation from the sea surface is suppressed by a temperature drop of the sea surface and this suppression can be implemented in large scale, a generation of the atmospheric depression is suppressed or retarded, or it is possible to weaken the strength. In regard to this, since each of the latter two is aimed at weakening the strength of the cloud forming the cyclone, it is considered that, so long as an energy supplied from the sea surface does not weaken, the cyclone continues to exist, and in addition there is a problem of environment pollution by the throwing-in of the chemical.

SUMMARY OF THE INVENTION

The present invention is one having been made by paying attention to the above points, and its problem is to efficiently lower the water temperature of the sea surface. Further, another problem of the present invention is to prevent the generation of the atmospheric depression or weaken the strength of the atmospheric depression having already generated by suppressing the evaporation of the water vapor from the sea surface by lowering the water temperature of the sea surface. Further, still another problem of the present invention is to prevent or reduce a generation of the red tide, the blue tide or the like due to the temperature rise of the sea surface.

In order to solve the above problems, the present invention is one in which, about an apparatus for lowering a water temperature of a sea surface, there has been adopted means in which a pipe for feeding a water is installed in a sea, a suction port of the pipe is disposed in a cold water zone whose temperature is lower than the water temperature of the sea surface, an injection port of the pipe is disposed in a required position below the sea surface, and a pump is connected to the pipe in order to suck a cold water from the suction port and inject it from the injection port to thereby supply it to an aim region below the sea surface, thereby mixing it with a warm water of higher temperature.

The present invention is the apparatus for lowering the water temperature of an aim sea surface, and its purpose exists in preventing the evaporation of the water vapor from the sea surface, or suppressing it as much as possible. As an invention for suppressing the evaporation of the water vapor from the sea surface, there is an apparatus for preventing a typhoon of Japanese Patent No. 2727128, and in this invention there is disclosed means in which the seawater surface is covered by a cover. However, an extent capable of being covered by the cover does not amount to much, so that the covers of very large numbers are required. On the other hand, it is considered that remarkable difficulties follow in laying and extending such wide covers on the sea surface, and removing them thereafter.

Whereupon, the present invention is one in which the water feed pipe is installed in the sea, the cold water whose temperature is lower than the sea surface is sucked from the cold water zone, near the aim sea surface, whose temperature is lower than a water temperature of the aim sea surface to thereby supply it to a region below the aim sea surface whose temperature is higher, and thus the temperature of the region concerned is lowered, thereby suppressing the evaporation of the water vapor from the aim sea surface. In many cases, although the cold water zone whose temperature is lower than the water temperature of the aim sea surface is demanded from a deep sea, it may be demanded from the cold water zone in a place nearer the water surface in a case where a cold water-mass is obtained nearby. The water feed pipe is made one which is installed in the sea, and there is adopted a method of pipe-transporting the seawater from an inside of the sea to an inside of the sea. There is not adopted a method of moving the cold water to an aim region in the sea and sprinkling it from above the sea surface. Its reason is because, besides the fact that an extra sprinkling apparatus is necessary, reversely it ruffles the sea surface to thereby promote the evaporation and thus it becomes an adverse effect.

By the pipe for feeding the water, since the cold water in the cold water zone whose temperature is lower than the water temperature of the sea surface is taken in and in-water-supplied to the aim sea surface, a higher temperature warm water in the aim sea surface is mixed with the cold water and thus a direct heat exchange is performed, so that it becomes a lower temperature. Accordingly, the water temperature of the aim sea surface is lowered by the water temperature of the cold water zone and, in a case where the cold water whose temperature is sufficiently low has been obtained, it is possible to cool the aim sea surface of a wider region to the lower temperature by a smaller quantity of water. In regard to this, in a case where the water temperature of the cold water zone is not low sufficiently, there may occur the fact that the aim sea surface cannot be cooled sufficiently even by a larger quantity of water. However, the water temperature, of the sea surface, at which the strength of the tropical atmospheric depression intensifies is deemed to be about 26° C. or higher (for example, a reference document made by the Meteorological Agency in August 1998). In regard to this, when the water temperature below 200 m from the sea surface is as sufficiently low as 15° C. to 20° C. even near the north latitude 20 degrees, since there is obtained a difference of several degrees to about ten degrees from the water temperature of the sea surface of 26° C., it is considered to be sufficiently effective for lowering the water temperature of the aim sea surface by 1 to 2 degrees. Further, since the temperature, of the cold water-mass, extending to the sea surface is lower by, e.g., about 5° C. than the water temperature of surroundings, when this is utilized it is possible to obtain an effect of some degree even if the pipe is not sunk 200 m or deeper.

Since a cold water quantity capable of being transported by a hose depends on a size and a flow velocity of a pipe, it is important to dispose the hoses of a necessary number in the aim sea surface. Whereupon, in the present invention, an underwater, platform having an underwater and float function is disposed in the sea, and it is possible to adopt a method of disposing an underwater platform having plural pipes longitudinally installed, in the sea of the aim sea surface while preparing a necessary number of underwater platforms. Since necessary for the underwater platform are a pump power for feeding the water, and a depth adjustment function for disposing the pump power and the underwater platform in a desired water depth, if it is possible to use, e.g., a retired submarine, it is near the best. This is because it is comparatively easy to remodel the submarine so as to be capable of utilizing its propulsion power as the pump power and the depth adjustment function can be utilized as it is.

By doing like this, by the present invention, it is possible to lower the sea surface of the temperature of about 26° C. for instance by 1 to 2° C., more desirably about 2 to 3° C. or more and, by this, it is possible to suppress the evaporation of the water vapor to thereby cut off an energy supply to the typhoon or the tropical atmospheric depression, or decrease an energy supply quantity. Additionally, since the water temperature lowering apparatus of the present invention can, by being disposed in an ocean current, lower the water temperature of the ocean current or can utilize the ocean current as a transportation means of the cold water, it becomes possible to lower the water temperatures of the sea surfaces just below the red tide and the blue tide or the tropical atmospheric depression and the typhoon, which have already generated, and by this it is also possible to weaken the strengths of the tropical atmospheric depression and the typhoon.

The underwater platform can possess a propulsion system such a propeller as a movement means in order to be moved to the aim sea surface, or in order to be moved to an optimum position with respect to the aim sea surface. Further, on the occasion of the movement of the underwater platform, in order to prevent the pipe for feeding the water from becoming a resistance, it is possible to incline the pipe for feeding the water such that an angle intersecting with a movement direction becomes smaller than a right angle.

Since the present invention is constituted and acts like the above, there are advantages that the water temperature of the aim sea surface can be certainly lowered, and by this it becomes possible to suppress the evaporation of the water vapor to thereby prevent the generation of the atmospheric depression or weaken its strength, or it is possible to prevent or reduce other harmful influences along with the temperature rise of the sea surface, such as generation of the red tide or the blue tide for instance.

DETAILED DESCRIPTION OF THE INVENTION

Figure 1:
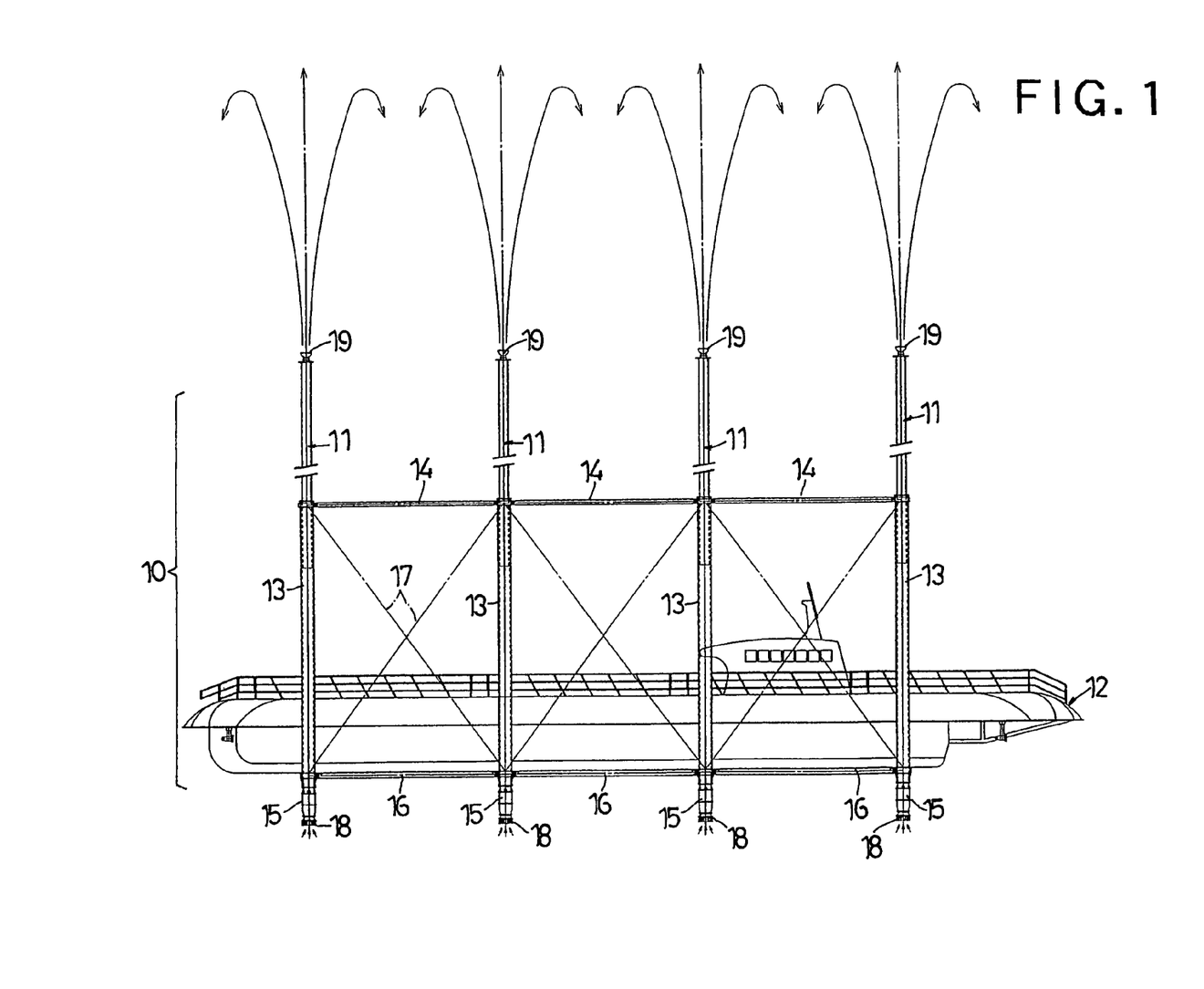
FIG. 1 is a side view showing an example 1 of an apparatus for lowering a water temperature of a sea surface according to the present invention.

Hereunder, the present invention is more detailedly explained while referring to an embodiment shown in the drawings. FIG. 1 is a side view showing an example 1 of a water temperature lowering apparatus 10 according to the present invention, and FIG. 2 a front view. In the drawings, 11 denotes a pipe, and it is longitudinally upwardly installed by a plural number in each of an underwater platform 12.

Figure 2:
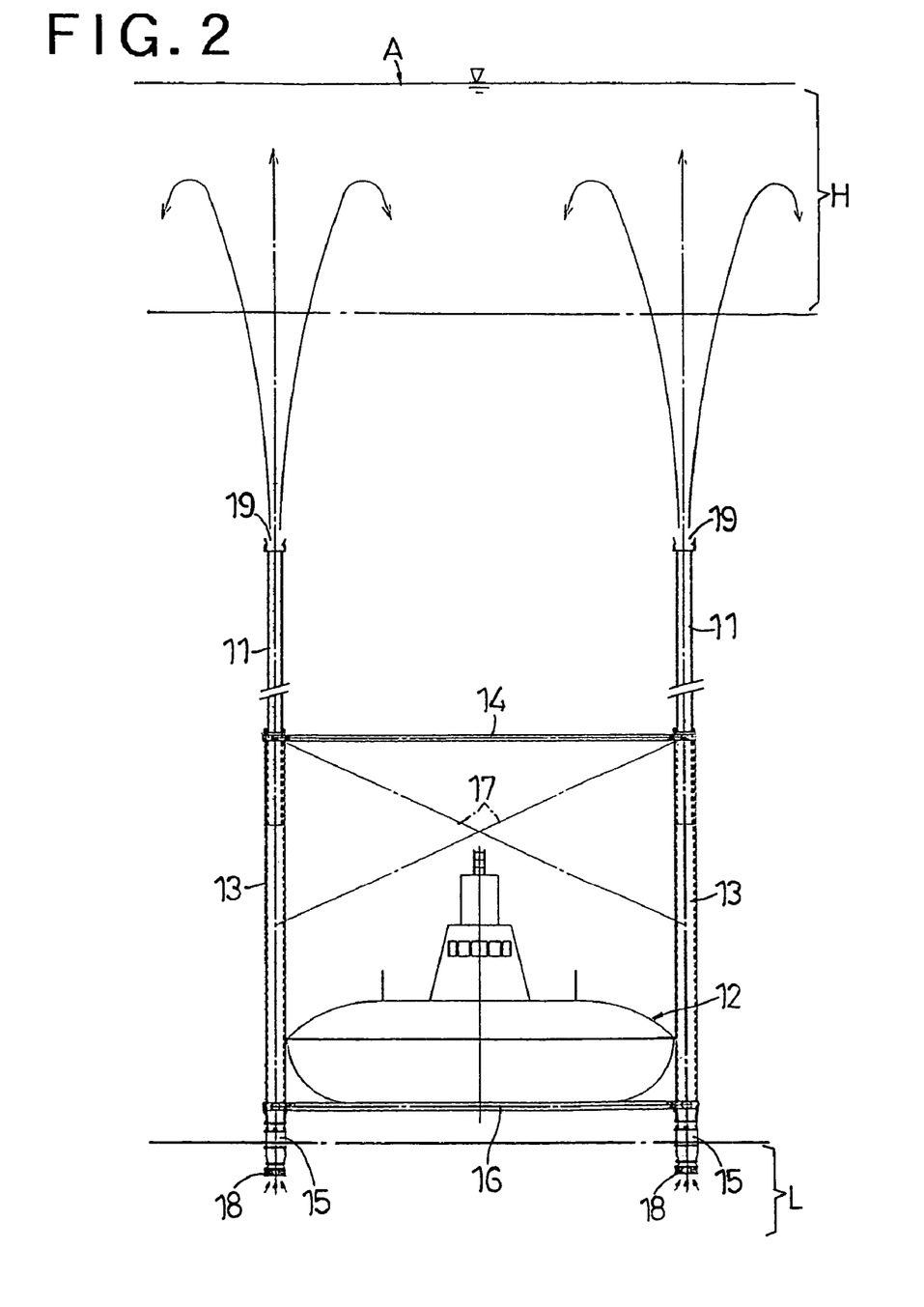
FIG. 2 is a front view of the above-described apparatus.

The underwater platform 12 has, as its minimum limit functions, an underwater depth adjustment function and a power supply function to a pump 15. In the underwater platform 12, several pipe elements 13 are stood respectively in both left and right broadsides of the platform, and are connected with beam materials 14, 16 being bridged to an upper part and a lower part of the pipe elements 13, and all of the pipe elements 13 and the upper and lower beam 14, 16 are reinforced by slant tension members 17, thereby forming a strong structural body of a rectangular parallelepiped shape as a whole. The structural body is fixedly attached to the underwater platform 12 by the upper beam members 16 for instance. In the exemplified case, the pipe 11 has a multistage telescopic structure, and is mounted to the pipe elements 13 fixed to the broadside so as to be capable of adjusting its upper and lower positions. In the drawings, 18 denotes a cold water suction port having been provided in a pump side, 19 an injection port having been provided in a hose upper end, and 20 a propeller.

Figure 3:
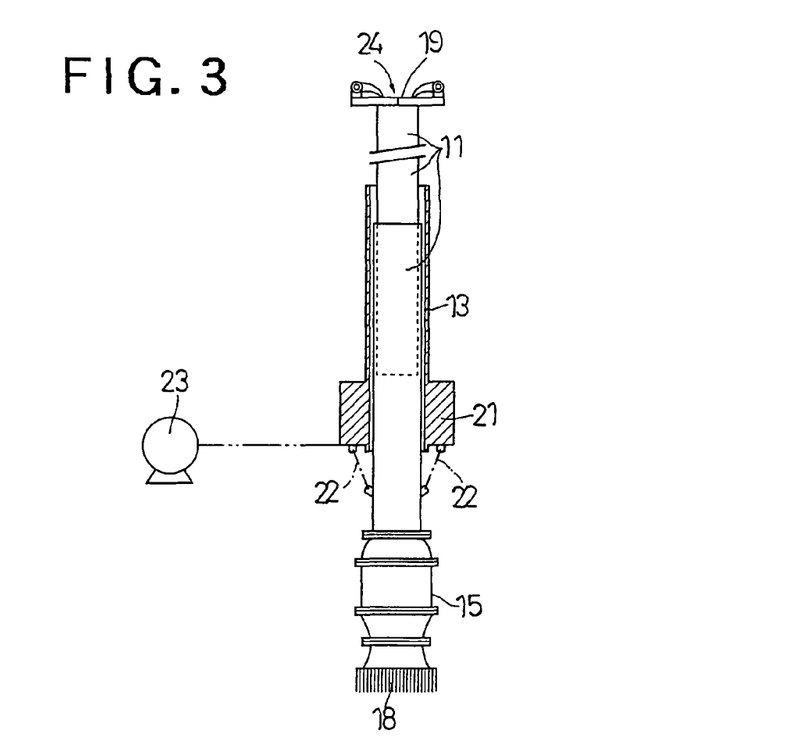
FIG. 3 is an enlarged view of a pipe having a submerged pump used in the apparatus of the present invention.

In the apparatus 10 of the embodiment, the pipe 11 is fitted into an inside of the pipe elements 13, combined so as to be capable of sliding upward and downward, and formed so as to be capable of being linked to a pipe holding portion 21, which holds the pipe elements 13, through a connection means 22 such as wire (refer to FIG. 3). The connection means 22 such as wire is provided so as to be capable of being wound up and down by a winch 23 mounted in an underwater platform side, thereby being possessed a pipe ascent and descent function so as to be capable of causing the pipe 11 to ascend and descend. This is means of which, even if the underwater platform itself is not dived to the depth of a cold water zone L, makes it possible to dispose the suction port 18 in an aim depth by an elongation/shrinkage and the decent of the pipe 11, and to adjust the ascent and the descent by coinciding a position of the suction port 18 with a position fluctuation of the cold water zone L.

The pump 15 is mounted to a lower end of the pipe 11 like this, and there is used, among the submerged pumps, one of a type called a high depth pump. In the case of this example, although the high depth does mean a depth of 100 to 200 m below the sea surface, it is desirable that the pump, in higher depth, e.g., up to 400 m below the sea surface, is operable. An on-off valve 24 is provided in an upper end of the pipe 11, and it opens if the water feed is started and closes if it ends. By this fact, it is possible that the pipe 11 is automatically ascended by a water pressure at a water feed time, and the valve is opened at a time when a water feed pressure has overcome the valve. Further, a nozzle is provided in the injection port 19, and the cold water is suitably supplied below the aim sea surface. It is desirable that, in a case where an injection port position is deep for instance, there is used a convergent type nozzle capable of taking a long reaching distance and, in a case where the injection port position is shallow, there is used a diffusion type nozzle whose reaching distance is short and which can rapidly diffuse the water to a wider range. However, if it is a nozzle of a type capable of adjusting the convergence and the diffusion, that nozzle is more preferable.

Figure 4:
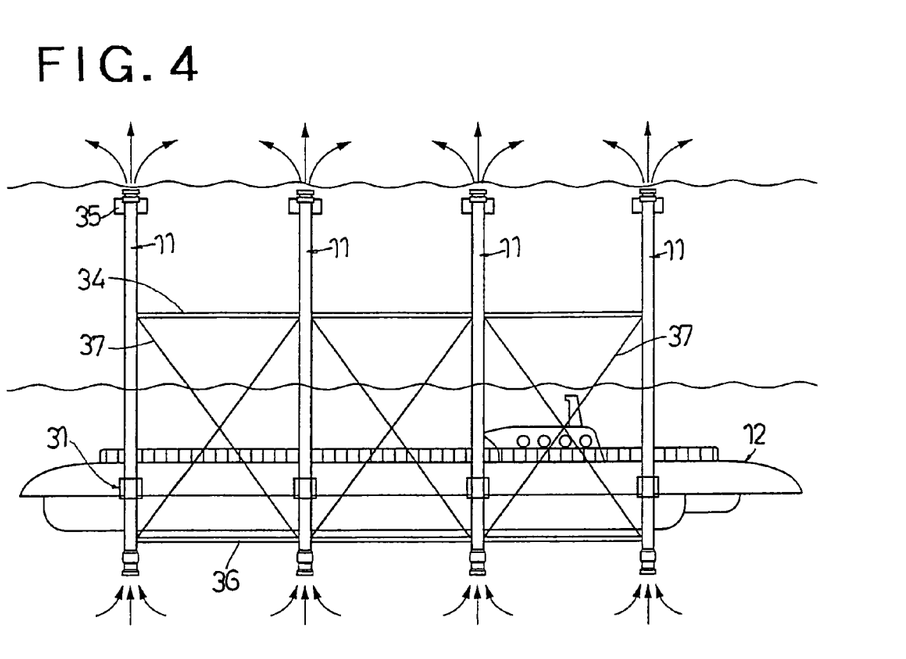
FIG. 4 is a side view of a use state of the apparatus of an example 2 according to the present invention.

The apparatus 10, of the present invention, constituted like this is disposed by a necessary number in an aim sea surface A or its vicinity (refer to FIG. 4). That is, as to the apparatus 10 of the present invention, the suction port 18 in the pipe lower end is disposed, e.g., in the cold water zone L existing in the sea near the aim sea surface, and the injection port 19 in the pipe upper end is disposed in a warm water zone H in a sea surface layer or a place near it. The cold water having been sucked from the suction port 18 is injected from the injection port 19 and mixed with the seawater in the warm water zone H, and it follows that, by performing the direct heat exchange, the water temperature of the warm water zone H is lowered. In the example of the embodiment, since it is estimated that a diameter of the pipe 11 is 500 φ and a water feed ability of the pump 15 3 t/min and the eight pipes 11 are used for one apparatus, by supposing the water feed quantity of 24 tons per minute and disposing the present apparatus 10 by a required number as shown in FIG. 4, the water temperature of the aim sea surface A is lowered. If the above apparatus 10 is disposed by 20, since there is the water feed ability of 480 tons per minute, i.e., 28800 tons per hour, it follows that, if the depth of the warm water zone H is 10 m, a sea region of 2880 square meters can be cooled by one hour. As to the temperature drop, in a case where it has been supposed that the water temperature of the warm water zone H is 26° C. and the water temperature of the cold water in the cold water zone L 20° C., there becomes a calculation that, supposing that the warm water and the cold water are the same quantity, they can be cooled to 23° C.

Figure 10:
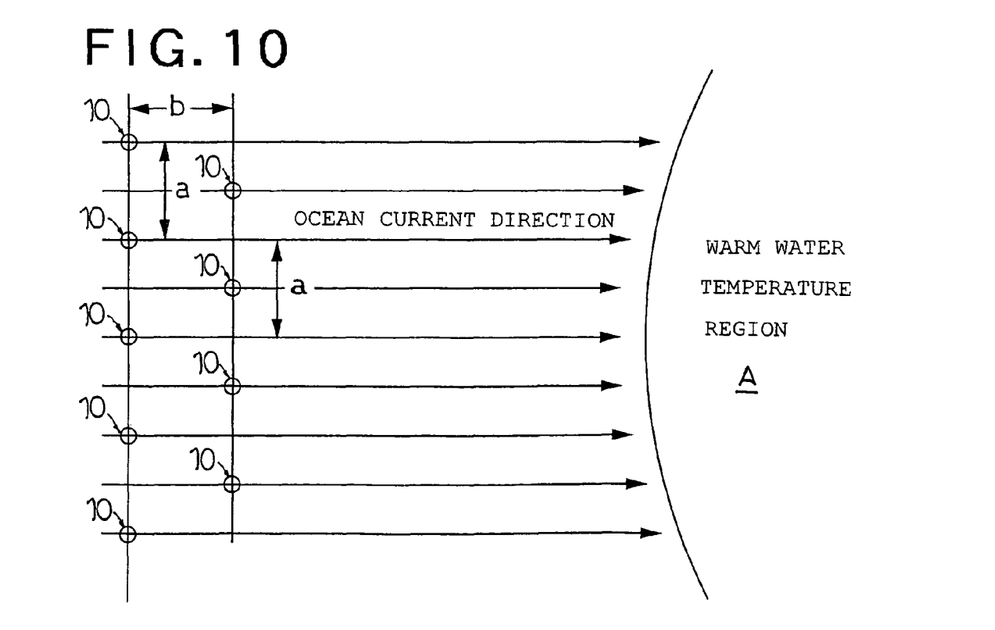
FIG. 10 is a plan explanatory view showing one example in a case where the apparatus of the present invention is implemented.

FIG. 10 shows an example in which, in a case where the warm water zone H is stagnating or moving at a lower velocity and there exists a higher velocity ocean current flowing into the warm water zone H, the ocean current is used for a cold water transportation means. The apparatus 10 of the present invention is disposed, e.g., like a lattice in a predetermined place in an upstream of the warm water zone H. Although lattice intervals a and b can be arbitrarily set, if the example of the above embodiment is used, it follows that there suffices if the present apparatus 10 is disposed with a 100 meters interval for instance. The fact that the water temperature of the warm water zone H lowers by as much as 3° C. from 26° C. for instance is an extremely remarkable advantage, and can be said that it is an effective means for making a situation under which a factor generating the tropical atmospheric depression is resolved or the tropical atmospheric depression is difficult to generate. Further, as having been already, partially mentioned, since the retired submarine can be utilized as the underwater platform 12 constituting the present invention, it becomes also a method of safely utilizing the submarine having become unnecessary.

Figure 5:
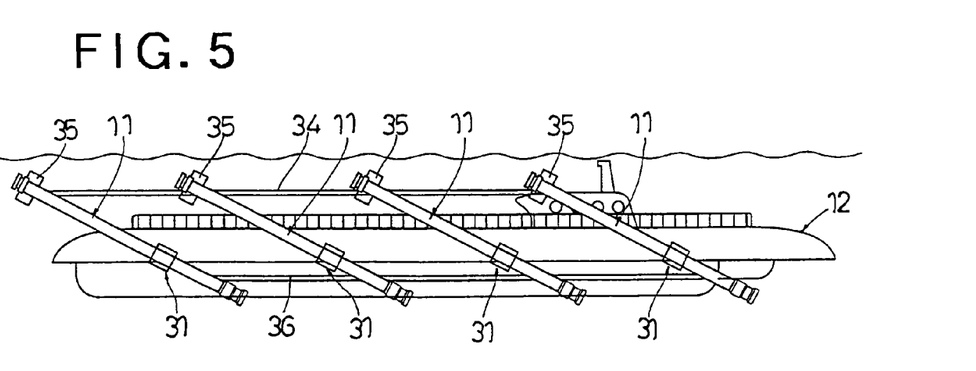
FIG. 5 is a side view under an advance state of the apparatus of FIG. 4.
Figure 6:
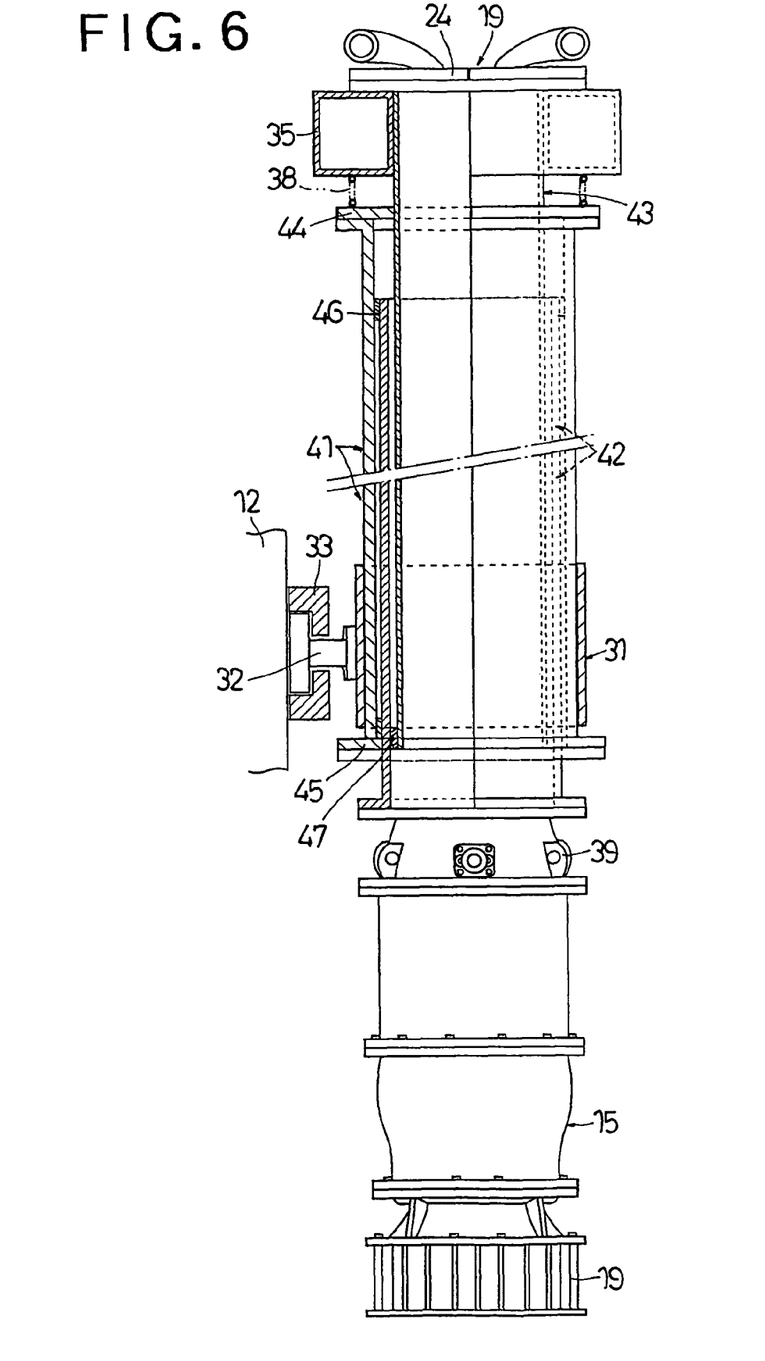
FIG. 6 is a partial sectional view showing a pipe for feeding a water in the apparatus of the example 2.
Figure 7:
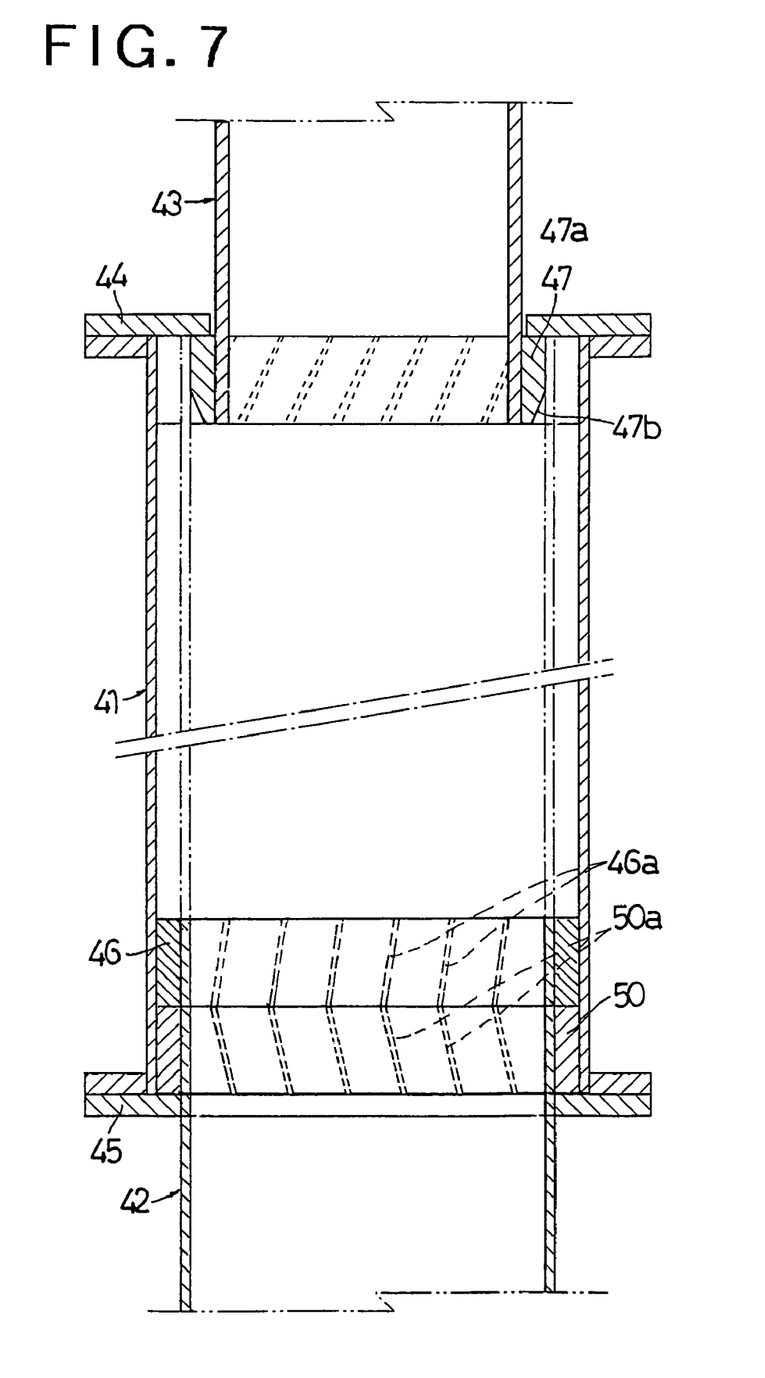
FIG. 7 is a sectional view showing the partially enlarged pipe in FIG. 6.

FIG. 4 to FIG. 9 show an example 2 of a water temperature lowering apparatus 30 according to the present invention. The water temperature lowering apparatus 30 of the example 2 is one having an inclinable pipe for feeding the water, and each water feed pipe is prepared by the same number degree as the example 1 and shaft-supported to the underwater platform 12 in a pipe holding part 31 such that its upper part is inclined at least rearward in such a manner that the angle intersecting with the movement direction becomes small. About the pipe for feeding the water, 32 denotes a rotation shaft and 33 a bearing, and they are installed in the underwater platform side (FIG. 6). Additionally, the pipe for feeding the water is rotatably shaft-supported in its upper part and lower part to beam members 34, 36 and fixed with slant tension members 37 being applied. Further, in an upper end of each pipe for feeding the water, there is provided a float 35 used for floating to the sea surface.

Figure 8:
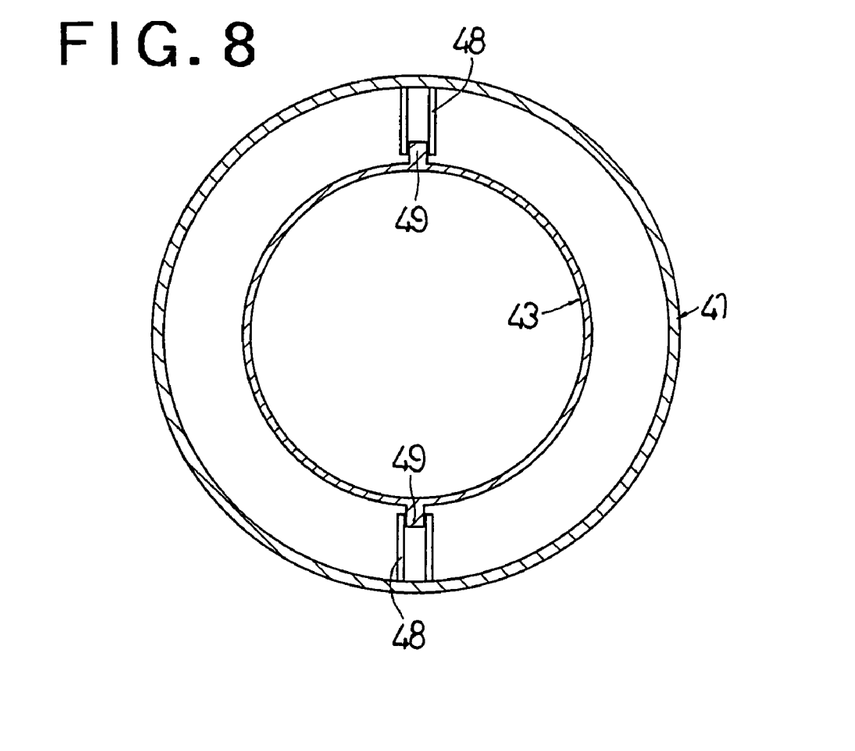
FIG. 8 is a sectional view showing a lock for counter rotation between an outer pipe and an inner pipe.
Figure 9:
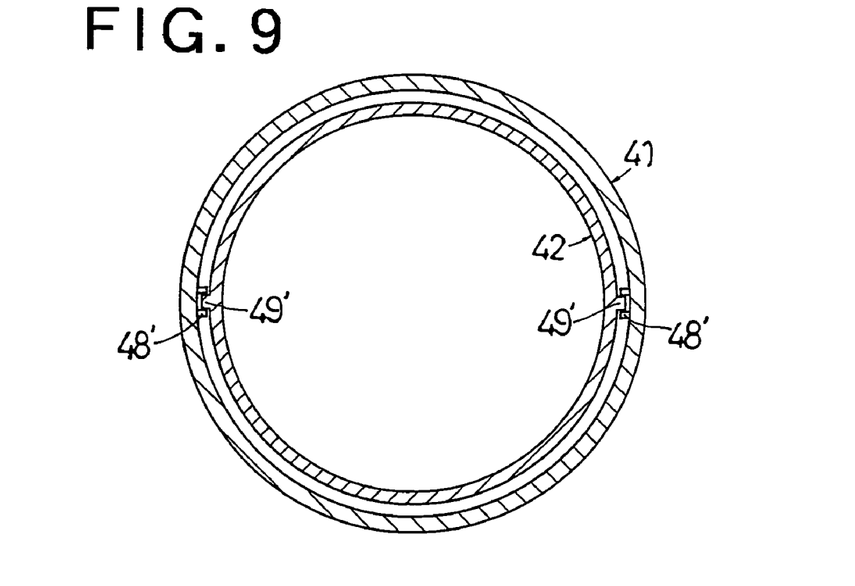
FIG. 9 is a sectional view showing a lock for counter rotation between the outer pipe and an intermediate pipe.

The pipe 11 for feeding the water in the example 2 has an outer pipe 41 fixed to the pipe holding part 31, an intermediate pipe 42 positioned inside the former, and an inner pipe 43 positioned more inside the same. The outer pipe 41 has upper and lower flange parts 44 and 45, a stopper 46 having been provided in an upper end of the intermediate pipe 42 is received by the upper flange part 44, and a stopper 47 having been provided in a lower end of the intermediate pipe 43 is received by the lower flange part 45. Further, between the outer pipe 41 and the intermediate pipe 42 and between the outer pipe 41 and the inner pipe 43, there are provided locks consisting of concave parts 48, 48' extending along a vertical direction and convex portions 49, 49' capable of sliding while fitting to the concave parts (FIG. 8 and FIG. 9).

The pump 15 is connected to a lower end of the intermediate pipe 42, and its lower end becomes the suction port 19 of the cold water. About other constitution, since it may be similar to the example 1, the same reference numeral is quoted and its explanation in detail is omitted. 38 denotes a buffer body, and it is disposed between the float 35 and the upper flange 44 and absorbs a shock when the inner pipe 43 has descended. Further, 39 denotes a wire attachment part.

As shown in FIG. 5, since the water temperature lowering apparatus 30 of the example 2, according to the present invention, constituted like this has the inclinable pipe for feeding the water, it is possible to improve a stability on the occasion of a movement due to a sailing or a towing by the propeller 20, and to decrease the resistance caused by that pipe for feeding the water. Further, since the float 35 is provided in the inner pipe 43 of the pipe for feeding the water, it is possible to utilize a buoyancy of the float 35 when ascending the inner pipe 43 by a water pressure by the pump 15 at a water feed time. Additionally, since the outer pipe 41, the intermediate pipe 42 and the inner pipe 43 are guided by the locks, the ascent/descent of the intermediate pipe 42 and the upward/downward movement of the inner pipe 43 are smoothly performed.

The invention can be utilized in a breeding of a marine organism by a water temperature adjustment of the aim sea surface, a suppression and a mitigation of a meteorological disaster by a control of a mesothermal climate, a mitigation of global warming, and the like.

What is claimed is:

1. An apparatus for lowering a water temperature of a sea surface, said apparatus comprising
   a plurality of elongated, substantially rigid pipes for feeding water located in a sea,
   a suction port of each of the plurality of pipes being disposed in a cold water zone of the sea whose temperature is lower than a water temperature of the sea surface,
   an injection port of each of the plurality of pipes being disposed below the sea surface,
   a pump connected to the plurality of pipes to suck cold water into the suction port and inject the cold water from the injection port to supply the cold water to an aim region below the sea surface, thereby mixing the cold water with a warm water of higher temperature, and
   an elongated, horizontally oriented underwater platform located submerged underwater below the sea surface and having a float function, each of the plurality of pipes being secured to the underwater platform at a respective pivot point located intermediate of the suction port and the injection port and the plurality of pipes being laterally spaced along the elongated, horizontally oriented underwater platform, the plurality of pipes extending longitudinally upwardly from the platform in the aim region in the sea with the injection part being located entirely above the elongated, horizontally oriented underwater platform,
   the plurality of pipes being laterally interconnected by beams for synchronized pivoting of the plurality of pipes together on the underwater platform.

2. The apparatus for lowering a water temperature of a sea surface according to claim 1, wherein the beams are located above and below the underwater platform.

3. The apparatus for lowering a water temperature of a sea surface according to claim 1, wherein slanted tension members also interconnect the plurality of pipes.

4. An apparatus for lowering a water temperature of a sea surface, said apparatus comprising
   a plurality of elongated, substantially rigid pipes for feeding water located in a sea,
   a suction port of each of the plurality of pipes being disposed in a cold water zone of the sea whose temperature is lower than a water temperature of the sea surface,
   an injection port of each of the plurality of pipes being disposed below the sea surface,
   a pump connected to the plurality of pipes to suck cold water into the suction port and inject the cold water from the injection port to supply the cold water to an aim region below the sea surface, thereby mixing the cold water with a warm water of higher temperature, and
   an elongated, horizontally oriented underwater platform located submerged underwater below the sea surface and having a float function, each of the plurality of pipes being secured to the underwater platform at a respective pivot point located intermediate of the suction port and the injection port and the plurality of pipes being laterally spaced along the elongated, horizontally oriented underwater platform, the plurality of pipes extending longitudinally upwardly from the platform in the aim region in the sea with the injection part being located entirely above the elongated, horizontally oriented underwater platform,
   the plurality of pipes for feeding the water being each rotatably mounted about the respective pivot point on the elongated, horizontally oriented underwater platform for rotation of the plurality of pipes from a vertical orientation to an inclined direction while maintaining an orientation of the elongated, horizontally oriented underwater platform such that, on an occasion of a horizontal movement of the elongated, horizontally oriented underwater platform, an angle of the elongated, substantially rigid plurality of pipes intersecting with the horizontal direction of movement of the elongated, horizontally oriented underwater platform becomes small due to a change in position of the plurality of pipes, bearings rotatably mounting the plurality of pipes on the underwater platform about the respective pivot points, the bearings each including a rotation shaft.

5. The apparatus for lowering a water temperature of a sea surface according to claim 4, wherein a stopper controls an amount of pivot of the plurality of pipes.

* * * * *